United States Patent
Vissman et al.

(10) Patent No.: US 12,234,191 B2
(45) Date of Patent: *Feb. 25, 2025

(54) BIOCERAMIC COMPOSITIONS

(71) Applicant: MULTIPLE ENERGY TECHNOLOGIES LLC, Washington, PA (US)

(72) Inventors: Shannon Vissman, Pittsburgh, PA (US); Francisco José Cidral-Filho, Washington, PA (US); Francisco de Paula Moreira, Florianópolis (BR); Steven Midttun, Boca Raton, FL (US)

(73) Assignee: Multiple Energy Technologies LLC, Washington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/104,865

(22) Filed: Nov. 25, 2020

(65) Prior Publication Data

US 2021/0078906 A1    Mar. 18, 2021

Related U.S. Application Data

(63) Continuation of application No. 16/041,449, filed on Jul. 20, 2018, now abandoned, which is a
(Continued)

(51) Int. Cl.
*B32B 1/02*    (2006.01)
*C04B 33/04*    (2006.01)
(Continued)

(52) U.S. Cl.
CPC .............. *C04B 35/44* (2013.01); *C04B 33/04* (2013.01); *C08K 3/346* (2013.01); *C12H 1/165* (2013.01);
(Continued)

(58) Field of Classification Search
CPC ... C04B 35/44; C04B 2235/3427; B32B 1/02; Y10T 428/1352; C12H 1/165; C08K 3/346; D06M 2101/34; D06M 2101/134
(Continued)

(56) References Cited

U.S. PATENT DOCUMENTS 2,929,414 A    3/1960  Lienhard
3,366,597 A *  1/1968  Fort, Jr. .................... D01F 1/10
                                                        524/786

(Continued)

FOREIGN PATENT DOCUMENTS

BR    PI0801804 A2    2/2009
BR    PI0805782 A2    8/2010
(Continued)

OTHER PUBLICATIONS

Tuduvz, LLC, Far Infrared therapy: Healing with far infrared therapy Website (online), Apr. 13, 2014 (retrieved on Aug. 11, 2015), www.endtimeessentials.com/far-infrared-therapy, 3 pages.
(Continued)

*Primary Examiner* — Marc A Patterson
(74) *Attorney, Agent, or Firm* — Wilson Sonsini Goodrich & Rosati.

(57) ABSTRACT

This invention relates to compositions and applications for a bioceramic composition that includes from about 45 to about 55% by weight of kaolinite ($Al_2Si_2O_5(OH)_4$); from about 5 to about 15% by weight of tourmaline; from about 3 to about 13% by weight of aluminum oxide ($Al_2O_3$); from about 11 to about 19% by weight of silicon dioxide ($SiO_2$); and from about 3 wt % to about 13 wt % zirconium oxide ($ZrO_2$).

16 Claims, 8 Drawing Sheets

Related U.S. Application Data continuation of application No. 13/760,546, filed on Feb. 6, 2013, now Pat. No. 10,252,945.

(60) Provisional application No. 61/705,986, filed on Sep. 26, 2012.

(51) Int. Cl.
| | |
|---|---|
| *C04B 35/44* | (2006.01) |
| *C08K 3/34* | (2006.01) |
| *C12H 1/16* | (2006.01) |
| *D06M 11/45* | (2006.01) |
| *D06M 11/46* | (2006.01) |
| *D06M 11/79* | (2006.01) |
| *D06M 16/00* | (2006.01) |
| *D06M 23/08* | (2006.01) |
| *D06M 23/16* | (2006.01) |
| *B32B 1/08* | (2006.01) |
| *D06M 101/34* | (2006.01) |

(52) U.S. Cl.
CPC ............ *D06M 11/45* (2013.01); *D06M 11/46* (2013.01); *D06M 11/79* (2013.01); *D06M 16/00* (2013.01); *D06M 23/08* (2013.01); *D06M 23/16* (2013.01); *C04B 2235/3217* (2013.01); *C04B 2235/3244* (2013.01); *C04B 2235/3409* (2013.01); *C04B 2235/3418* (2013.01); *C04B 2235/3427* (2013.01); *D06M 2101/34* (2013.01)

(58) Field of Classification Search
USPC .................................................. 428/35.7, 689
See application file for complete search history.

(56) References Cited

U.S. PATENT DOCUMENTS

| | | | |
|---|---|---|---|
| 3,969,551 | A | 7/1976 | Ellsworth |
| 4,175,556 | A | 11/1979 | Freezer |
| 4,344,908 | A | 8/1982 | Smith et al. |
| 4,424,645 | A | 1/1984 | Rannali |
| 4,680,822 | A | 7/1987 | Fujino et al. |
| 4,968,531 | A | 11/1990 | Maeda |
| 5,208,089 | A | 5/1993 | Norris |
| 5,258,228 | A | 11/1993 | Komuro |
| 5,296,531 | A | 3/1994 | Belde et al. |
| 5,299,335 | A | 4/1994 | Ivester et al. |
| 5,645,934 | A | 7/1997 | Marcolongo et al. |
| 5,820,348 | A | 10/1998 | Fricke |
| D405,885 | S | 2/1999 | Pinter et al. |
| 5,894,067 | A | 4/1999 | Kim |
| 5,935,550 | A | 8/1999 | Mohri et al. |
| 5,972,215 | A | 10/1999 | Kammel |
| 5,972,815 | A | 10/1999 | Bae |
| 6,074,754 | A | 6/2000 | Jacobsen et al. |
| 6,207,077 | B1 | 3/2001 | Burnell-Jones |
| 6,207,600 | B1 | 3/2001 | Nakajima et al. |
| 6,264,907 | B1 | 7/2001 | Matsuda et al. |
| 6,506,403 | B1 | 1/2003 | Yu |
| 6,516,229 | B1 | 2/2003 | Wey |
| 6,645,517 | B2 | 11/2003 | West et al. |
| 6,651,256 | B1 | 11/2003 | Swift |
| 6,669,882 | B2 | 12/2003 | Seok |
| D489,904 | S | 5/2004 | Lee |
| 6,797,377 | B1 | 9/2004 | Delucia et al. |
| 6,884,256 | B2 | 4/2005 | Huang et al. |
| 6,951,900 | B2 | 10/2005 | Blanchard et al. |
| 7,056,845 | B2 | 6/2006 | Waeber et al. |
| 7,063,801 | B2 | 6/2006 | Sato |
| 7,074,499 | B2 | 7/2006 | Schnurer et al. |
| 7,311,209 | B2 | 12/2007 | Bentz et al. |
| D598,660 | S | 8/2009 | Schaller |
| 7,824,350 | B2 | 11/2010 | Lu |
| D629,210 | S | 12/2010 | Hong |
| D631,971 | S | 2/2011 | Turtzo |
| 8,104,482 | B2 | 1/2012 | Komuro |
| 8,231,968 | B2 | 7/2012 | Lin et al. |
| D664,739 | S | 8/2012 | Gibson |
| D667,226 | S | 9/2012 | Levy |
| 8,333,018 | B2 | 12/2012 | Lin et al. |
| 8,366,757 | B2 | 2/2013 | Oliveira et al. |
| 8,388,750 | B2 | 3/2013 | Gay et al. |
| 8,409,262 | B2 | 4/2013 | Lin et al. |
| 8,491,825 | B2 | 7/2013 | Lin et al. |
| D704,455 | S | 5/2014 | Blakely |
| 8,815,158 | B2 | 8/2014 | Zheng et al. |
| 8,968,819 | B2 | 3/2015 | Hirata |
| 8,980,775 | B2 | 3/2015 | Francy et al. |
| 9,044,384 | B2 | 6/2015 | Canova et al. |
| 9,120,959 | B2 | 9/2015 | Hara et al. |
| D746,543 | S | 1/2016 | McClain |
| 9,376,576 | B2 | 6/2016 | Jung et al. |
| D766,597 | S | 9/2016 | Vissman et al. |
| 9,833,509 | B2 | 12/2017 | Vissman |
| 9,962,441 | B2 | 5/2018 | Vissman |
| 10,252,945 | B2 | 4/2019 | Vissman et al. |
| 10,368,502 | B2 | 8/2019 | Letton et al. |
| 11,076,539 | B2 | 8/2021 | Letton et al. |
| 2002/0014716 | A1 | 2/2002 | Seok |
| 2002/0042641 | A1 | 4/2002 | Johnson et al. |
| 2002/0195751 | A1 | 12/2002 | Kim et al. |
| 2003/0225356 | A1 | 12/2003 | Kulichikhin et al. |
| 2004/0043174 | A1 | 3/2004 | Schnurer et al. |
| 2004/0087430 | A1 | 5/2004 | Sola |
| 2004/0202899 | A1 | 10/2004 | Komuro |
| 2004/0225049 | A1 | 11/2004 | Komuro |
| 2005/0060807 | A1 | 3/2005 | Kaizuka |
| 2005/0066448 | A1 | 3/2005 | Waeber et al. |
| 2005/0171584 | A1 | 8/2005 | Slingo |
| 2005/0227047 | A1 | 10/2005 | Sutter et al. |
| 2005/0233888 | A1 | 10/2005 | Seneschal et al. |
| 2005/0241069 | A1 | 11/2005 | Lin |
| 2006/0137701 | A1 | 6/2006 | Snaidr |
| 2006/0275348 | A1 | 12/2006 | Komuro |
| 2007/0116775 | A1 | 5/2007 | Lee |
| 2009/0065732 | A1 | 3/2009 | Yeh et al. |
| 2009/0126412 | A1* | 5/2009 | Pollet ...................... C03C 25/16 28/165 |
| 2009/0137171 | A1 | 5/2009 | Waeber et al. |
| 2009/0171266 | A1 | 7/2009 | Harris |
| 2009/0267271 | A1 | 10/2009 | Kim |
| 2010/0186917 | A1 | 7/2010 | Simonson et al. |
| 2010/0227790 | A1 | 9/2010 | Mayer et al. |
| 2010/0281936 | A1 | 11/2010 | Lee |
| 2010/0282433 | A1 | 11/2010 | Blackford |
| 2011/0021098 | A1 | 1/2011 | Tabellion et al. |
| 2011/0027548 | A1 | 2/2011 | Nusser et al. |
| 2011/0059037 | A1 | 3/2011 | Canova et al. |
| 2011/0112461 | A1 | 5/2011 | Hirata |
| 2011/0208099 | A1 | 8/2011 | Naghavi et al. |
| 2012/0060344 | A1 | 3/2012 | Smeets |
| 2012/0135485 | A1 | 5/2012 | Koros et al. |
| 2014/0069008 | A1 | 3/2014 | Herrera-Estrella et al. |
| 2014/0079920 | A1 | 3/2014 | Blakely |
| 2014/0087040 | A1 | 3/2014 | Vissman et al. |
| 2014/0173801 | A1 | 6/2014 | Bell |
| 2014/0187413 | A1 | 7/2014 | Lagaron et al. |
| 2014/0197562 | A1 | 7/2014 | Piccinini et al. |
| 2014/0209594 | A1 | 7/2014 | Besner |
| 2014/0255664 | A1 | 9/2014 | Gartmann et al. |
| 2014/0264186 | A1 | 9/2014 | Spatz et al. |
| 2014/0324132 | A1 | 10/2014 | Wey |
| 2015/0017856 | A1 | 1/2015 | Davis et al. |
| 2015/0132351 | A1 | 5/2015 | Canova et al. |
| 2015/0224230 | A1 | 8/2015 | Hirata |
| 2015/0291868 | A1 | 10/2015 | Rajagopalan et al. |
| 2015/0335742 | A1 | 11/2015 | Vissman et al. |
| 2016/0136386 | A1 | 5/2016 | Vissman et al. |
| 2016/0136452 | A1 | 5/2016 | Vissman et al. |
| 2016/0143838 | A1 | 5/2016 | Canova et al. |
| 2016/0151300 | A1 | 6/2016 | Madvin |
| 2017/0049890 | A1 | 2/2017 | Vissman |

(56) References Cited

U.S. PATENT DOCUMENTS

| | | | |
|---|---|---|---|
| 2017/0165369 | A1 | 6/2017 | Bender |
| 2018/0055933 | A1 | 3/2018 | Vissman |
| 2018/0327316 | A1 | 11/2018 | Vissman et al. |
| 2023/0414757 | A1 | 12/2023 | Vissman et al. |

FOREIGN PATENT DOCUMENTS

| | | |
|---|---|---|
| BR | MU9000125 U2 | 9/2011 |
| BR | MU9001019 U2 | 1/2012 |
| CN | 2568221 Y | 8/2003 |
| CN | 1488807 A | 4/2004 |
| CN | 2633257 Y | 8/2004 |
| CN | 1887784 A | 1/2007 |
| CN | 100366574 C | 2/2008 |
| CN | 101195537 A | 6/2008 |
| CN | 102553623 A | 7/2012 |
| CN | 200938861 Y | 8/2017 |
| EP | 1816254 A1 | 8/2007 |
| EP | 2900621 A1 | 8/2015 |
| EP | 3140004 A1 | 3/2017 |
| GB | 883264 A | 11/1961 |
| GB | 1093041 A | 11/1967 |
| GB | 1378140 A | 12/1974 |
| GB | 2073613 A | 10/1981 |
| GB | 2463264 A | 3/2010 |
| JP | H0434915 B2 | 6/1992 |
| JP | 07331501 | 12/1995 |
| JP | 09225045 A | 9/1997 |
| JP | H10222697 A | 8/1998 |
| JP | 2000119987 A | 4/2000 |
| JP | 2001192257 A | 7/2001 |
| JP | 200246200 A * | 2/2002 |
| JP | 2004107113 A | 4/2004 |
| JP | 2004359811 A | 12/2004 |
| JP | 2008073488 A | 4/2008 |
| JP | 2008308353 A | 12/2008 |
| JP | 2008308354 A | 12/2008 |
| JP | 2010212156 A | 9/2010 |
| JP | 2011506668 A | 3/2011 |
| JP | 2011517476 A | 6/2011 |
| KR | 20040065199 A | 7/2004 |
| KR | 20050046213 A | 5/2005 |
| KR | 200500461213 | 5/2005 |
| KR | 100783486 B1 | 12/2007 |
| KR | 20090098932 A | 9/2009 |
| KR | 20100009129 A | 1/2010 |
| KR | 1020100009129 A | 1/2010 |
| KR | 101067409 | 9/2011 |
| KR | 101067409 B1 | 9/2011 |
| WO | WO-02059414 A2 | 8/2002 |
| WO | WO-2006007753 A1 | 1/2006 |
| WO | WO-2006022220 A1 | 3/2006 |
| WO | WO-2009077834 A2 | 6/2009 |
| WO | WO-2009118419 A1 | 10/2009 |
| WO | WO-2009124367 A2 | 10/2009 |
| WO | WO-2011059037 A1 | 5/2011 |
| WO | WO-2012135485 A2 | 10/2012 |
| WO | WO-2013053587 A1 | 4/2013 |
| WO | WO-2013182568 A2 | 12/2013 |
| WO | WO-2013182568 A3 | 1/2014 |
| WO | WO-2014052159 A1 | 4/2014 |
| WO | WO-2015171467 A1 | 11/2015 |
| WO | WO-2022197743 A1 | 9/2022 |

OTHER PUBLICATIONS

Co-pending U.S. Appl. No. 18/634,243, inventors Letton; Alan et al., filed Apr. 12, 2024.
Mota et al.: Fatigue Pictogram: an option for assessing fatigue severity and impact. Rev Esc Enferm USP 43(Spe):1079-1086 (2009).
PCT/US2022/020445 International Preliminary Report on Patentability dated Sep. 28, 2023.
PCT/US2022/020445 International Search Report and Written Opinion Jun. 3, 2022.
U.S. Appl. No. 18/173,669 Office Action dated May 9, 2024.
Agathocleous et al.: Preliminary Results of a Phase I/II Study of Weekly or Twice Weekly Bortezomib in Combination with Rituximab, in Patients with Follicular Lymphoma, Mantle Cell Lymphoma and Waldenstrom's Macroglobulinaemia. Blood (ASH Annual Meeting Abstracts) 110:Abstract 2559 (2007).
Aksenov: Markesbery, W.R. Changes in thiol content and expression of glutathione redox system genes in the hippocampus and cerebellum in Alzheimer disease. NeurosciLett, v. 302, p. 141-145, 2001.
Australian Patent Application No. 2013323956 Notice of Acceptance dated Apr. 13, 2016.
Australian Patent Application No. 2013323956 Examination Report issued May 29, 2015.
Australian Patent Application No. 2013323956 Examiner's Report No. 3 dated Jan. 22, 2016.
Australian Patent Application No. 2013323956 Patent Examination Report No. 2 dated Nov. 6, 2015.
Bagnato et al.: Far infrared emitting plaster in knee osteoarthritis: a single blinded, randomised clincal trial, Reumatismo, 2012, 64 (6): 388-394.
Bannister: Calabrese, L. Assays for superoxide dismutase. Methods Biochem Anal, v. 32, p. 279-312, 1987.
Beever: Far-infrared saunas for treatment of cardiovascular risk factors Summary of published evidence. Canadian Family Physician, vol. 55: Jul. 2009, 691-696.
Brazilian Patent Application No. BR112016026001-5 Search Report dated Jul. 17, 2020.
Chinese Patent Application No. 201380049767.7 Office Action dated Sep. 20, 2016.
Chinese Patent Application No. 201380049767.7 Third Office Action dated Oct. 23, 2017.
Chinese Patent Application No. 2015800367193 Office Action dated May 2, 2018.
Cidral-Filho et al.: Effect of Far Infrared Emitted by Bioceramics on Clinical Measures of Physical Fitness. Journal of Alternative and Complementary Medicine. 20(5):A71 2014.
Cidral-Filho et al.: Far Infrared Emitted by Ceramic Materials Increases Paw Temperature and Reduces Mechanical Hypersensitivity and Knee Edema in a Rat Model of Monoiodoacetate-Induced Osteoarthritis 3rd International Conference and Exhibition on Orthopedics & Rheumatology, Jul. 23-30, 2014, San Francisco Airport, CA, Orthop. Muscul. System, 3(2):87 (2014).
Cidral-Filho et al.: Neurobiological Mechanisms and Perspectives on Far-Infrared Emitting Ceramic Materials for Pain Relief. Journal of Yoga and Physical Therapy, 4(2):1000159, 2 pages, 2014.
Cidral-Filho. Neurobiological Mechanisms and Perspectives on Far-Infrared Emitting Ceramic Materials for Pain Relief J Yoga Phys Ther 4 (2):159, 2014.
Colombia Patent Application No. 15-090.148 Official Action dated Jun. 17, 2016.
Colombia Patent Application No. 15-090.148 Official Action mailed May 17, 2015.
Colombia Patent Application No. NC2016/0003955 Office Action dated Mar. 20, 2018.
Colombia Patent Application No. NC2016/0003955 Office Action dated Oct. 20, 2016.
Colombian Patent Application No. NC20160003955 Office Action dated Sep. 20, 2018.
Columbia Patent Application No. 15-090.148 Official Action dated Nov. 11, 2016.
Complementary, Alternative, or Integrative Health: What's In a Name? (Created Oct. 2008, Updated Mar. 2015), Retrieved Jul. 2015 from http://nccam.nih.gov/health/whatiscam, 5 pages.
Conrado et al.: Reduction in body measurements after use of a garment made with synthetic fibers embedded with ceramic nanoparticles, Journal of Cosmetic Dermatology, 10, 1, 30-35, 2011.
Co-pending U.S. Appl. No. 29/560,574, inventor Vissman; Shannon, filed Apr. 7, 2016.

(56) References Cited

OTHER PUBLICATIONS

Emer et al.: Effect of Far Infrared Emitted by Bioceramics on Parameters of Physical Performance in Mice The Journal of Alternative and Complementary Medicine 20(5):A34, 2 pages, 2014.
Emer et al.: Far infrared emitted by bioceramics reduces mechanical and thermal hyperalgesia in an animal model of chronic inflammatory pain The Journal of Alternative and Complementary Medicine 20(5):A33, 1 page, 2014.
Emer et al.: Far Infrared Therapy Emitted by Bioceramics Improves Pstural Sway in Young Brazilian University Judokas The Journal of Alternative and Complementary Medicine 20(5):A73, 1 page, 2014.
Emer et al.: University of Southern Santa Catarina, Laboratory of Experimental Neuroscience Far Infrared Emitted by Bioceramics Reduced Hypernociception of Inflammatory Origin in Mice Study presented at the 45th Congress of Pharmacology and Experimental Therapeutics, Ribeirao Preto, SP, Brazil, 2013 4 pages, 2014.
ESilva et al.: Effects of the Use of MIG3 Bioceramics Fabrics Use—Long Infrared Emitter—in Pain, Intolerance to Cold and Periodic Limb Movements in Post-Polio Syndrome, Arq Neuropsiquiatr 2009; 67(4): 1049-1053.
Esterbauer. Cheeseman, K.H. Determination of aldehydic lipid peroxidation products: malonaldehyde and 4-hydroxynonenal. Methods Enzymol, v. 186, p. 407-421, 1990).
Eurasian Patent Application No. 201590577 Office Action Jan. 18, 2016.
Eurasian Patent Application No. 201590577 Office Action dated Apr. 4, 2017.
Eurasian Patent Application No. 201590577 Office Action dated Aug. 30, 2016.
Eurasian Patent Application No. 201692098 Office Action dated Jul. 10, 2018.
European Patent Application No. 13842936 Extended European Search Report dated Jul. 17, 2015.
European Patent Application No. 13842936.0 Office Action dated Apr. 3, 2018.
European Patent Application No. 15789387.6 extended European Search Report dated Dec. 8, 2017.
European Patent Application No. 15789387.6 First Official Action dated Feb. 7, 2019.
Gale et al.: Infrared therapy for chronic low back pain: A randomized, controlled trial, Pain Res Manage, vol. 11, No. 3, p. 193-196, Autumn 2006.
Hong: Effects of Heat Therapy using a far infrared rays heating element for dysmenorrhea in high school girls. J Korean Acad. Nurs vol. 41 No. 1, 141-148, 2011.
Hsieh et al.: Local and Systemic Cardiovascular Effects from Monochromatic Infrared Therapy in Patients with Knee Osteoarthritis: A Double-Blind, Randomized, Placebo-Controlled Study, Evidence-Based Complementary and Alternative Medicine, vol. 2012, Article ID 583016, 9 pages, 2012.
Indian Patent Application No. 1722/DELNP/2015 Office Action dated Aug. 31, 2018.
Israeli Patent Application No. 237601 Examination Report dated Nov. 1, 2017.
Japanese Patent Application No. 11335966-A dated May 1998 to Kusakari et al.
Japanese Patent Application No. 2015-534562 Office Action dated May 7, 2018.
Japanese Patent Application No. 2015-534562 Office Action dated Sep. 26, 2017.
Ke et al.:et al.: Effects of Somatothermal Far-Infrared Ray on Primary Dysmenorrhea: A Pilot Study. Evidence-Based Complementary and Alternative Medicine, vol. 2012, Article ID 240314, doi: 10.1155/2012/240314, 8 pages.
Kim et al.: Bioceramic Effects to Enhance Secondary Metabolites Production in Tissue Culture of Some Medicinal Plants, Korean J. Medicinal Crop Sci. 12(2) : 118-122 (2004).

Ko et al.: Effect of Ceramic-Impregnated Thermoflow Gloves on Patients with Raynaud's Syndrome: Randomized, Placebo-Controlled Study, Alternative Medicine Review, Aug. 2002; vol. 7(4), pp. 328-335.
Koo et al.: The application of PCMMcs and Sic by commercially direct dual-complex coating on textile polymer. Applied Surface Science 255:8313-8318. 2009.
Lai et al.: Effects of Far-Infrared Irradiation on Myofascial Neck Pain: a Randomized, Double-Blind, Placebo-Controlled Pilot Study, The Journal of Alternative and Complementary Medicine, Feb. 2014, vol. 20, Issue No. 2, 123-129.
Lai et al.: Effects of far-infrared irradiation on myofascial neck pain: A randomized, double-bind, placebo-controlled pilot study The Journal of Alternative and Complementary Medicine, 0(0):1-7 (2013).
Leung et al.: Physiological Effects of Bioceramic Material: Harvard Step, Resting Metabolic Rate and Treadmill Running Assessments, Chinese Journal of Physiology, Dec. 21, 2013, vol. 56, Issue No. 6, 1-7.
Leung et al.: Biological effects of melt spinning fabrics composed of 1% bioceramic material, Textile Research Journal, 82(11) 1121-1130, 2010.
Leung et al.: Bone and Joint Protection Ability of Ceramic Material with Biological Effects, Chinese Journal of Physiology 55(1): 47-54, 2012.
Leung et al.: Direct and Indirect Effects of Ceramic Far Infrared Radiation on the Hydrogen Peroxide-scavenging Capacity and on Murine Macrophages under Oxidative Stress, Journal of Medical and Biological Engineering, 31(5): 345-351, 2011.
Leung et al.: Effects of Far Infrared Rays Irradiated from Ceramic Material (Bioceramic) on Psychological Stress-Conditioned Elevated Heart Rate, Blood Pressure, and Oxidative Stress-Suppressed Cardiac Contractility, Chinese Journal of Physiology 55(5): 323-330, 2012.
Leung et al.: In vitro cell study of the Possible Anti-inflammatory and Pain Relief Mechanism of Far-infrared Ray-emitting Ceramic Material , J. Med. and Biol. Eng. 33(2): 179-184, 2012.
Leung et al.: Physiological effects of bioceramic material: Harvard step, resting metabolic rate and treadmill running assessments. Chinese Journal of Physiology, 56(x):1-7 (2013).
Leung et al.: Protective effect of non-ionized radiation from far infrared ray emitting ceramic material (cFIR) against oxidative stress on human breast epithelial cells, Articles in Press, J. Med. Biol. Eng. (Jul. 28, 2012), doi: 10.5405/jmbe.1133, 25 pages.
Leung et al.: Physical-chemical Test Platform for Room Temperature, Far-infrared Ray Emitting Ceramic Materials (cFIR). Journal of Chinese Medical Society, 58:653-658 (2011 Published online on Oct. 12, 2011; doi: 10.1002/jccs.201190101.
Levine, R.L.; Garland, D.; Oliver, C.N.; Amici, A.; Climent, I.; Lenz, A.G.; Ahn, B.W.; Shaltiel, S.; Stadman, E.R. Determination of carbonyl content in oxidatively modified proteins. Methods Enzymol, v. 186, p. 464-478, 1990.
Liau et al.: Inhibitory Effects of Far-Infrared Ray-Emitting Belts on Primary Dysmenorrhea, International Journal of Photoenergy, vol. 2012, Art. ID 238468, 6 pages.
Lin et al.: Antioxidant Effect of Far-Infrared Radiation in Human Journal of Public Health Frontier. Jun. 2013, vol. 2 Iss. 2, pp. 97-102.
Lin et al.: Enhancement of Transdermal Delivery of Indomethacin and tamoxifen by Far-Infrared Ray-Emitting Ceramic material (Bioceramic): A Pilot Study. Translational Medicine 2013, 3:1.
Lowry O.H.: Protein measurement with the Folin phenol reagent. J BiolChem, v. 193, p. 265-275, 1951.
Martins et al.: Far-Infrared Emitting Ceramic Material-Impregnated Fabrics Reduces Pain and Improves Quality of Life in Patients with Fibromyalgia: Double-Blinded Randomized Placebo Controlled Trial downloaded Mar. 13, 2015 from: https://icongresso.itarget.com.br/useradm/usr.nov.trab.view2.php?js=1&print=1&id_tra=1007 i page Abstract ID 1007.
Martins et al.: Neuromodulation by Far-Infrared Emitting Ceramic Material in an Animal Model of Persistent Inflammatory Pain

(56) References Cited

OTHER PUBLICATIONS

Downloaded on Mar. 13, 2015 from: https://congresso.itarget.com.br/useradm/usr.nov.trab.view2.php?js=1&print=1&id_tra=991, 1 page, Abstract ID:991.
New Zealand Patent Application No. 705601 First Examination Report dated Feb. 16, 2018.
New Zealand Patent Application No. 705601 Office Action dated Aug. 7, 2018.
PCT/US2013/060636 International Preliminary Report on Patentability dated Apr. 9, 2015.
PCT/US2013/060636 International Search Report and Written opinion dated Dec. 10, 2013.
PCT/US2015/028910 International Preliminary Report on Patentability dated Nov. 17, 2016.
PCT/US2015/028910 International Search Report and Written Opinion mailed Sep. 1, 2015.
Peruvian Application No. 002173-2016 Search Report dated Dec. 25, 2020.
Tuduvz LLC Far Infrared Therapy. Healing with Far Infrared Therapy. Website [online] Apr. 13, 2014 [retrieved on Aug. 11, 2015] Retrieved from the Internet: http://webarchive.org/web/20140413115846/http://www.endtimesessentials.com/far-infrared-therapy. (Accessed Sep. 11, 2015) . . . .
United States Court of Appeals for the Federal Circuit in RE: Stephan Company, Appellant 2016-181, Appeal from the United States Patent and Trademark Office, Patent Trial and Appeal Board in U.S. Appl. No. 12/456,567. Decided: Aug. 25, 2017.
U.S. Appl. No. 13/760,546 Office Action dated Dec. 13, 2016.
U.S. Appl. No. 13/760,546 Office Action dated Jun. 15, 2017.
U.S. Appl. No. 13/760,546 Office Action dated Jun. 17, 2016.
U.S. Appl. No. 13/760,546 Office Action dated Nov. 30, 2017.
U.S. Appl. No. 13/760,546 Office Action mailed Apr. 9, 2015.
U.S. Appl. No. 13/760,546 Office Action mailed Sep. 23, 2015.
U.S. Appl. No. 14/069,749 Office Action dated Jul. 28, 2016.
U.S. Appl. No. 14/702,467 Office Action dated May 8, 2017.
U.S. Appl. No. 14/702,467 Office Action dated Oct. 7, 2016.
U.S. Appl. No. 14/965,741 First Action Interview—Office Action dated Sep. 14, 2016.
U.S. Appl. No. 14/965,741 First Action Interview dated Apr. 18, 2016.
U.S. Appl. No. 14/965,741 Office Action dated Feb. 9, 2017.
U.S. Appl. No. 14/965,741 Office Action dated Jul. 3, 2017.
U.S. Appl. No. 14/965,746 Office Action dated Aug. 10, 2017.
U.S. Appl. No. 14/965,746 Office Action dated Aug. 25, 2016.
U.S. Appl. No. 14/965,746 Office Action dated Jun. 28, 2018.
U.S. Appl. No. 14/965,746 Office Action dated Mar. 23, 2017.
U.S. Appl. No. 14/965,746 Office Action dated Mar. 24, 2016.
U.S. Appl. No. 15/308,283 Final Office Action dated Dec. 27, 2018.
U.S. Appl. No. 15/308,283 Office Action dated Jun. 13, 2018.
U.S. Appl. No. 15/719,418 Final Office Action dated Sep. 25, 2020.
U.S. Appl. No. 15/719,418 Office Action dated Mar. 30, 2020.
U.S. Appl. No. 16/041,449 Restriction Requirement dated Jun. 26, 2020.
U.S. Appl. No. 29/495,157 Ex Parte Quayle Office Action dated May 9, 2016.
U.S. Appl. No. 29/495,157 Restriction Requirement dated Feb. 11, 2016.
U.S. Appl. No. 15/308,283 Office Action dated Jul. 23, 2019.
U.S. Appl. No. 15/826,584 Office Action dated Feb. 9, 2018.
Vatansever F. and Hamblin M. Far infrared radiation (FIR): its biological effects and medical applications. Photon Lasers Med 2012; 1(4): 255-266.
Yoo et al.: Investigation of jewelry powders radiating far-infrared rays and the biological effects on human skin, J. Cosmet Sci., 53, (May/Jun. 2002), 175-184.
York R. and Gordon I., Effect of optically modified polyethylene terephthalate fiber socks on chronic foot pain. BMC Complementary and Alternative Medicine 2009, 9:10.

* cited by examiner

BIOCERAMIC COMPOSITIONS

CROSS-REFERENCE

This application is a continuation of U.S. application Ser. No. 16/041,449, filed on Jul. 20, 2018, which is a continuation of application Ser. No. 13/760,546, filed on Feb. 6, 2013, now issued as U.S. Pat. No. 10,252,945 on Apr. 9, 2019, which claims the benefit of U.S. Provisional Application No. 61/705,986, filed Sep. 26, 2012, the contents of each are incorporated herein by reference for all purposes.

BACKGROUND

In 1800, Dr. F. W. Herschel of Great Britain found and reported to the academic world a wavelength ranging from 0.7 to 1000 microns, just beyond visible light, called infrared, which has strong physical properties and great thermal activity. The natural resonant frequency range of water and living organisms, including man, falls within the infrared range. For example, the wavelength range of 6-18 μm is well known to be beneficial to the human body by virtue of its activating and energizing effect on the body. Indeed, human skin radiates 9.36 μm infrared wave which is very close to the resonant frequency of a water molecule—and rightly so since our bodies are about 70% water. Infrared waves can be the safest and most beneficial energy source available.

According to The National Center for Complementary and Alternative Medicine (NCCAM), "some CAM practices involve manipulation of various energy fields to affect health. Such fields may be characterized as veritable (measurable) or putative (yet to be measured). Practices based on veritable forms of energy include those involving electromagnetic fields (e.g., magnet therapy and light therapy)." (*What is Complementary and Alternative Medicine?* (October 2008). Retrieved Aug. 31, 2012, from www.ncaam.nih.gov/health/whatiscam).

Bioceramics include ceramics which radiate beneficial infrared waves. Because of their advantages to human health, bioceramics are now used for various purposes including biomedicine and living necessaries. These aim to utilize the effects of the infrared radiation emitted therefrom, including, for example, maintenance of freshness of foods, deodorization, vitalization, etc. There is a need therefore, to develop additional bioceramic compositions and uses thereof that provide additional beneficial effects.

SUMMARY OF THE INVENTION

There is provided in accordance with various embodiments a bioceramic composition that includes from about 45 wt % to about 55 wt % kaolinite ($Al_2Si_2O_5(OH)_4$); from about 5 wt % to about 15 wt % tourmaline; from about 3 wt % to about 13 wt % aluminum oxide ($Al_2O_3$); from about 11 wt % to about 19 wt % silicon dioxide ($SiO_2$); and from about 3 wt % to about 13 wt % zirconium oxide ($ZrO_2$), wherein the amounts are by total weight of the composition. In one embodiment, the amount of kaolinite ranges from about 45 wt % to about 50 wt % by total weight of the composition. In another embodiment, the amount of kaolinite ranges from about 51 wt % to about 55 wt % by total weight of the composition. In yet another embodiment, the amount of kaolinite ranges from about 47 wt % to about 53 wt % by total weight of the composition. In a further embodiment, the largest dimension of any particle in the composition is from about 0.5 μm to about 25 μm.

Also presented herein is an article that includes: (a) a substrate; and (b) a bioceramic composition that includes particles dispersed throughout the substrate, wherein the bioceramic composition includes from about 45 wt % to about 55 wt % kaolinite ($Al_2Si_2O_5(OH)_4$); from about 5 wt % to about 15 wt % tourmaline; from about 3 wt % to about 13 wt % aluminum oxide ($Al_2O_3$); from about 11 wt % to about 19 wt % silicon dioxide ($SiO_2$); and from about 3 wt % to about 13 wt % zirconium oxide ($ZrO_2$), wherein the amounts are by total weight of the bioceramic composition. In one embodiment, the substrate includes at least one elastomer. In another embodiment, the substrate includes a polymer that is selected from polyoxybenzylmethylenglycolanhydride, polyvinyl chloride, polystyrene, polyethylene, polypropylene, polacrylonitrile, polylactic acid, and polyvinyl butyral. In yet another embodiment, the elastomer is selected from polychloroprene, nylon, a polyvinyl chloride elastomer, a polystyrene elastomer, a polyethylene elastomer, a polypropylene elastomer, a polyvinyl butyral elastomer, silicone, a thermoplastic elastomer, and combinations thereof.

In a further embodiment, the substrate includes a material selected from wool, silk, cotton, canvas, jute, glass, nylon, polyester, acrylic, elastane, polychloroprene, expanded polytetrafluoroethylene-containing laminate fabrics, and combinations thereof. In yet another embodiment, the substrate includes a metal selected from zinc, molybdenum, cadmium, scandium, titanium, vanadium, chromium, manganese, iron, cobalt, nickel, copper, zirconium, niobium, ruthenium, rhodium, palladium, silver, tantalum, tungsten, rhenium, osmium, iridium, platinum, gold, aluminum, gallium, indium, tin, and combinations thereof.

In one embodiment, the article is selected from apparel, jewelry, patches (e.g. patches that are fabricated to adhere to skin, such as transdermal patches, transdermal hydrogel patches, etc.), pads, insoles, bedding, body supports, foam rollers, lotions, soaps, tape, glassware, furniture, paints, inks, labels, carpets, mats, food and/or beverage containers, drink koozies, headware (e.g. helmets, hats, etc.), footwear (e.g. socks, shoes, etc.), gloves, and earphones. In another embodiment, the substrate includes a polymer and has a shape that is configured to receive a beverage container. In yet another embodiment, the article further includes at least one light emitting diode (LED), at least one magnet, or a combination thereof.

Also presented is a method for preparing a polymeric article that includes the steps of: (a) mixing a bioceramic composition that includes from about 45 wt % to about 55 wt % kaolinite ($Al_2Si_2O_5(OH)_4$); from about 5 wt % to about 15 wt % tourmaline; from about 3 wt % to about 13 wt % aluminum oxide ($Al_2O_3$); from about 11 wt % to about 19 wt % silicon dioxide ($SiO_2$); and from about 3 wt % to about 13 wt % zirconium oxide ($ZrO_2$), wherein the amounts are by total weight of the bioceramic composition, with a polymeric substrate while the substrate is in a liquid or fluid form; and (b) molding the polymeric substrate into a final shape or form. In one embodiment, the amount of kaolinite ranges from about 45 wt % to about 50 wt % by total weight of the bioceramic composition. In another embodiment, the amount of kaolinite ranges from about 51 wt % to about 55 wt % by total weight of the bioceramic composition. In yet another embodiment, the amount of kaolinite ranges from about 47 wt % to about 53 wt % by total weight of the bioceramic composition. In a further embodiment, the method further includes exposing the article to an electromagnetic signal at a frequency that is between about 0.05 Hz and about 20 MHz for a period of time from about 5 minutes to about 10 minutes.

Also presented is a method for reducing furfural content in a beverage by: exposing a beverage containing furfural to a bioceramic composition that includes from about 45 wt % to about 55 wt % kaolinite ($Al_2Si_2O_5(OH)_4$); from about 5 wt % to about 15 wt % tourmaline; from about 3 wt % to about 13 wt % aluminum oxide ($Al_2O_3$); from about 11 wt % to about 19 wt % silicon dioxide ($SiO_2$); and from about 3 wt % to about 13 wt % zirconium oxide ($ZrO_2$), wherein the amounts are by total weight of the bioceramic composition, for a time period suitable to reduce the furfural content.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
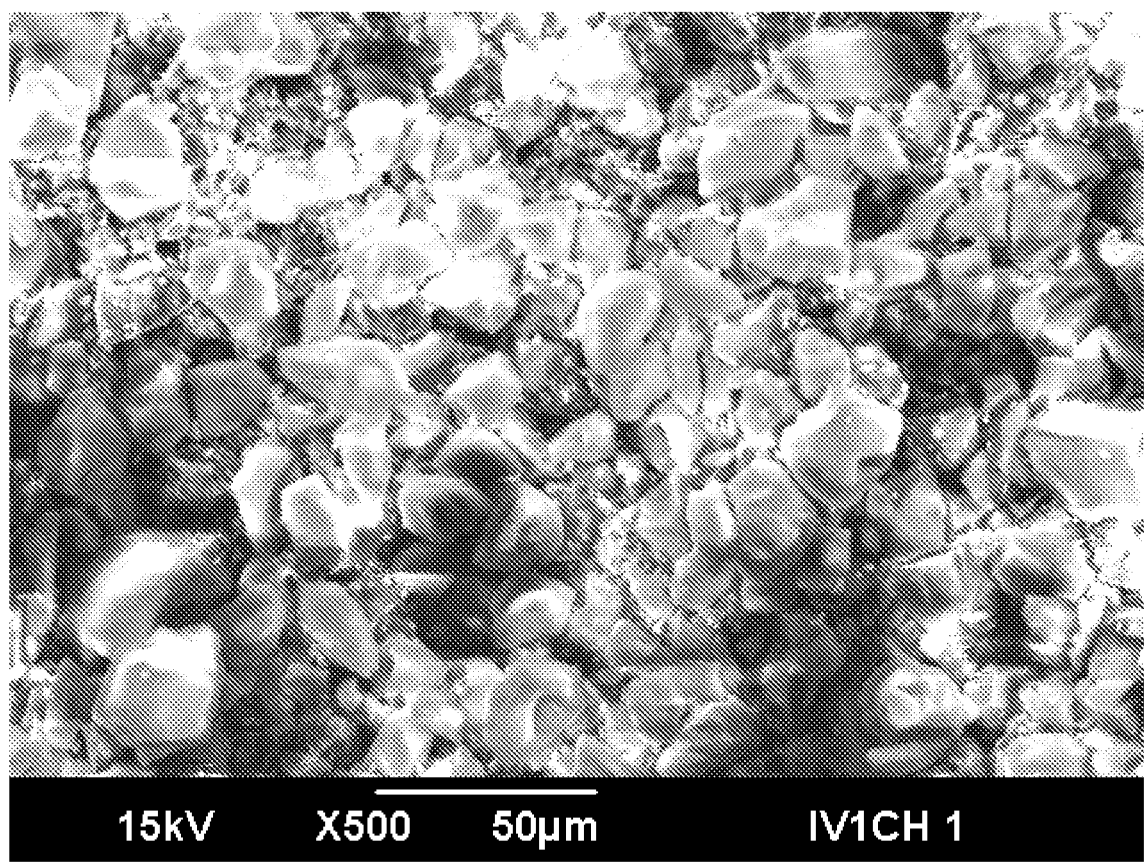
FIG. 1 is an electron microscopy image of a bioceramic composition prepared in accordance with various embodiments at 500× magnification.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The biological effects of bioceramics are based on the fact that the infrared frequency range is the natural resonant frequency range of water and living organisms. Because a considerable part of living organisms includes water, the resonant frequency of water molecules radiated from bioceramics can activate the water and affect living organisms.

This document describes bioceramic compositions that include from about 45 wt % to about 55 wt % of kaolinite ($Al_2Si_2O(OH)_4$); from about 5 wt % to about 15 wt % of tourmaline; from about 3 wt % to about 13 wt % of aluminum oxide ($Al_2O_3$); from about 11 wt % to about 19 wt % by weight of silicon dioxide ($SiO_2$); and from about 3 wt % to about 13 wt % zirconium oxide ($ZrO_2$), wherein the amounts are by total weight of the composition. In one embodiment, the amount of kaolinite in the bioceramic composition is selected from approximately 45 wt %, 46 wt %, 47 wt %, 48 wt %, 49 wt %, 50 wt %, 51 wt %, 52 wt %, 53 wt %, 54 wt %, and 55 wt % by total weight of the composition. In another embodiment, the amount of kaolinite ranges from about 45 wt % to about 50 wt % by total weight of the composition. In yet another embodiment, the amount of kaolinite ranges from about 51 wt % to about 55 wt % by total weight of the composition. In a further embodiment, the amount of kaolinite ranges from about 47 wt % to about 53 wt % by total weight of the composition. In one embodiment, the largest dimension of any particle in the bioceramic composition ranges from about 0.5 μm to about 25 μm. In another embodiment, the largest dimension of any particle in the bioceramic composition ranges from about 1 pm to about 20 μm. In yet another embodiment, the largest dimension of any particle in the bioceramic composition ranges from about 2 μm to about 15 μm.

As used herein, the term "tourmaline" retains its meaning known in the mineral and gemstone arts. For example, Tourmaline, according to "The Mineral & Gemstone Kingdom" website (www.minerals.net/tourmaline_chemical_formula.aspx), is "a group of isomorphous minerals with an identical crystal lattice. Each member of the Tourmaline group has its own chemical formula, due to small differences in their elemental distribution." According to language taken directly from the website:

A simple generic formula for the Tourmaline group is: $X_1Y_3A_6(BO_3)_3Si_6O_{18}(OH)_4$ Where: X=Na and/or Ca and Y=Mg, Li, Al, and/or $Fe^{2+}$ This creates the formula: $(Na,CaMg,Li,A,Fe^{2+})_3Al_6(BO_3)_3\ Si_6O_{18}(OH)_4$ In some less common varieties, the Al may be replaced by other elements. For example, in Uvite, the Al is partially replaced by Mg.

This expands the formula to: $(Na,CaMg,Li,A,Fe^{2+})_3(A,Mg,Cr)_6(BO_3)_3Si_6O_{18}(OH)_4$

[ ]Buergerite contains three O atoms and one F atom in place of the OH radical. A Buergerite molecule also contains an Fe atom that is in a 3+ oxidation state.

This further expands the formula to: $(Na,Ca)(Mg,Li,Al,Fe^{2+},Fe^{3+})_3(Al,Mg,Cr)_6(BO_3)_3Si_6O_{18}(OH,O,F)_4$ Finally, the website provides the chemical formulae of individual members of the Tourmaline group:

Schorl: $NaFe^{2+}_3Al_6(BO_3)_3Si_6O_{18}(OH)_4$
Dravite: $NaMg_3Al_6(BO_3)_3Si_6O_{18}(OH)_4$
Elbaite: $Na(Li,Al)_3Al_6(BO_3)_3Si_6O_{18}(OH)_4$
Liddicoatite: $Ca(Li,Al)_3Al_6(BO_3)_3Si_6O_{18}(OH)_4$
Uvite: $Ca(Mg,Fe^{2+})_3AsMg(BO_3)_3Si_6O_{18}(OH)_4$
Buergerite: $NaFe^{3+}_3Al_6(BO_3)_3Si_6O_{18}O_3F$ Various embodiments also include articles that incorporate a bioceramic composition. In one embodiment, the bioceramic composition is present as a coating on at least a portion of the surface of the article or is incorporated directly into a substrate prior to or during manufacture of the article itself. In another embodiment, the substrate is a polymeric, cloth, or metallic material.

For example, in one embodiment a polymeric article is prepared by mixing a bioceramic composition with the polymeric substrate while the substrate is in a liquid or fluid form. The bioceramic/polymer material is then molded into the final desired shape or form. The amount of bioceramic composition incorporated into the polymeric substrate can be any suitable amount. In one embodiment, the bioceramic composition is added in an amount from about 1 wt % to about 35 wt % by total weight of the article. In another embodiment, the bioceramic composition is added in an amount from about 3 wt % to about 25 wt % by total weight of the article. In yet another embodiment, the bioceramic composition is added in an amount from about 5 wt % to about 15 wt % by total weight of the article. In a further embodiment, the bioceramic composition is added in an amount from about 7 wt % to about 13 wt % by total weight of the article. In another embodiment, the polymeric substrate is in the form of a cloth substrate, which is discussed in greater detail below.

The polymeric substrate can include any polymer that is useful for preparing an article that incorporates a bioceramic composition. For example, the polymeric substrate can include at least one elastomeric polymer or at least one non-elastomeric polymer. As used herein "polymeric" includes, but is not limited to, homopolymers, copolymers, cross-linked polymers and polymer systems, polymer blends that include continuous and/or dispersed phases, and the like.

Elastomers include, but are not limited to, viscoelastic polymers, such as, for example, natural rubbers, synthetic rubbers, rubbery, and rubber-like polymeric materials. One example of a synthetic rubber is polychloroprene (Neoprene). In one embodiment, the elastomer is selected from polychloroprene, nylon, a polyvinyl chloride elastomer, a polystyrene elastomer, a polyethylene elastomer, a polypropylene elastomer, a polyvinyl butyral elastomer, silicone, a thermoplastic elastomer, and combinations thereof.

Thermoplastic elastomers (TPEs) are composite materials obtained from the combination of an elastomeric material and a thermoplastic material. TPEs are elastomeric materials that are dispersed and crosslinked in a continuous phase of a thermoplastic material. Examples of conventional TPEs include Santoprene®, available from Advanced Elastomers Systems, Inc. and Sarlink® available from DSM Elastomers, Inc.

In one embodiment, the non-elastomer is selected from a group of polymers that includes, but is not limited to, polyoxybenzylmethylenglycolanhydride, polyvinyl chloride, polystyrene, polyethylene, polypropylene, polacrylonitrile, polyvinyl butyral, polylactic acid, and the like.

With respect to an article that includes a cloth substrate and a bioceramic composition, the bioceramic composition can be applied to the cloth by any process known in the cloth/fabric art using a liquid or fluid carrier that contains the bioceramic composition. For example, a silk-screen printing process can be employed. Silk-screen printing is a printing process which uses a form—referred to as a frame or sieve—that includes a fabric with a very fine mesh, which is left permeable to the ink in the areas of the image to be reproduced and impermeable in the other areas. In one embodiment, the bioceramic composition can be incorporated into an ink, which is then silk-screened onto at least a portion of the surface of the cloth substrate.

In another embodiment, the bioceramic composition is combined with one or more liquid polymers (e.g. polyester and/or the like). The bioceramic/polymer composition is then extruded using methods known in the art to form fibers that are used in preparing a cloth substrate.

The amount of bioceramic composition added to an ink or other liquid/fluid carrier can be any suitable amount. In one embodiment, the amount of the bioceramic composition ranges from about 1 wt % to about 35 wt % by total weight of the carrier and bioceramic composition. In another embodiment, the amount of the bioceramic composition ranges from about 3 wt % to about 25 wt % by total weight of the carrier and bioceramic composition. In yet another embodiment, the amount of the bioceramic composition ranges from about 5 wt % to about 15 wt % by total weight of the carrier and bioceramic composition. In a further embodiment, the amount of the bioceramic composition ranges from about 7 wt % to about 13 wt % by total weight of the carrier and bioceramic composition.

Cloth substrates useful herein include fabric or textile substrates prepared by any method known to one of skill in the cloth fabrication art. Such techniques include, but are not limited to, weaving, knitting, crocheting, felting, knotting, bonding, and the like. Suitable starting materials for the cloth substrates include natural or synthetic (e.g. polymeric) fibers and filaments. In one embodiment, the cloth substrate includes, but is not limited to, a material selected from wool, silk, cotton, canvas, jute, glass, nylon, polyester, acrylic, elastane, polychloroprene, expanded polytetrafluoroethylene-containing laminate fabrics (e.g. Gore-Tex® fabric), and combinations thereof.

With respect to an article that includes a metallic substrate, the bioceramic composition can be applied to the metal in a liquid/fluid form by any process known in the metal processing art. For example, the bioceramic composition can be incorporated into a liquid/fluid carrier, such as, but not limited to, a paint, sealant, varnish, and the like, and applied to at least a portion of the surface of the metallic substrate. The amount of bioceramic composition added to a paint or other liquid/fluid carrier can be any suitable amount. In one embodiment, the amount of the bioceramic composition added to a paint or other liquid/fluid carrier ranges from about 1 wt % to about 35 wt % by total weight of the carrier and bioceramic composition. In another embodiment, the amount of the bioceramic composition added to a paint or other liquid/fluid carrier ranges from about 3 wt % to about 25 wt % by total weight of the carrier and bioceramic composition. In yet another embodiment, the amount of the bioceramic composition added to a paint or other liquid/fluid carrier ranges from about 5 wt % to about 15 wt % by total weight of the carrier and bioceramic composition. In a further embodiment, the amount of the bioceramic composition added to a paint or other liquid/fluid carrier ranges from about 7 wt % to about 13 wt % by total weight of the carrier and bioceramic composition.

Suitable metallic substrates for use herein include any metallic substrate that is useful for preparing an article that incorporates a bioceramic composition. Exemplary metallic substrates include pure metals and alloys. In one embodiment, the metallic substrate is selected from zinc, molybdenum, cadmium, scandium, titanium, vanadium, chromium, manganese, iron, cobalt, nickel, copper, zirconium, niobium, ruthenium, rhodium, palladium, silver, tantalum, tungsten, rhenium, osmium, iridium, platinum, gold, aluminum, gallium, indium, tin, and the like.

Virtually any article that is capable of incorporating a bioceramic composition is suitable. In one embodiment, the article is selected from apparel (e.g. garments), jewelry, patches (e.g. patches that are fabricated to adhere to skin, such as transdermal patches, transdermal hydrogel patches, etc.), pads, insoles, bedding, body supports, foam rollers, lotions, soaps, tape, glassware, furniture, paints, inks, labels, carpets, mats, food and/or beverage containers, drink koozies (e.g. bottle or can), headware (e.g. helmets, hats, etc.), footwear (e.g. shoes, sneakers, sandals, etc.), earphones, and the like.

In another embodiment, the article is apparel selected from shirts, pants, shorts, dresses, skirts, jackets, hats, undergarments, socks, caps, gloves, scarves, diapers, and the like. In yet another embodiment, the article is jewelry selected from bracelets, necklaces, earrings, medallions, pendants, rings, and the like. In still another embodiment, the article is bedding selected from blankets, sheets, pillows, pillow cases, comforters, duvet covers, mattress covers, mattress pads, and the like. In another embodiment, the article is a body support selected from knee wraps, elbow supports, compression arm sleeves, compression leg sleeves, wrist wraps, and the like.

Optionally, articles can further include at least one light emitting diode (LED), at least one magnet, or a combination thereof.

Optionally, articles can further include one or more additional frequencies imprinted on the article using a frequency generator, i.e., a signal generating machine that emits an electromagnetic signal (audio or radio waves) at a selected frequency or frequencies. Examples of commercially available frequency generators include, but are not limited to Rife Machines (e.g. ProWave 101; F-Scan2; TrueRife F-117; Wellness Pro 2010; Global Wellness; GB4000; GB4000 BCX Ultra; and the like. In general, frequency generators produce selected frequencies that are then transmitted through a connecting cable to a commercially available frequency imprinting plate (e.g. SP9 or SP12 vortex frequency imprinting plates). In one embodiment, the frequency or frequencies range from about 0.05 Hz to about 20 MHz. In another embodiment, the frequency or frequencies range from about 5 Hz to about 5 MHz. In a further embodiment, the frequency or frequencies range from about 100 Hz to about 0.1 MHz. In yet another embodiment, the frequency or frequencies range from about 1 KHz to about 10 KHz. The article to be imprinted with the selected frequency or frequencies is exposed to the frequency emitted by the generator. To accomplish this, the article may be placed on the imprinting plate and exposed to the signal of the selected frequency or frequencies for imprinting. In one embodiment, the imprinting process takes about 5-10 minutes per cycle depending upon the amount of frequencies to be imprinted and the selected imprinting program. In another embodiment, the imprinting process takes about 5 minutes, 6 minutes, 7 minutes, 8 minutes, 9 minutes, or 10 minutes per cycle depending upon the amount of frequencies to be imprinted and the selected imprinting program. Imprinted articles may transmit the frequency imprints to a user upon contact in conjunction with the waves emitted from the bioceramic composition that is incorporated into the article.

Figure 4:
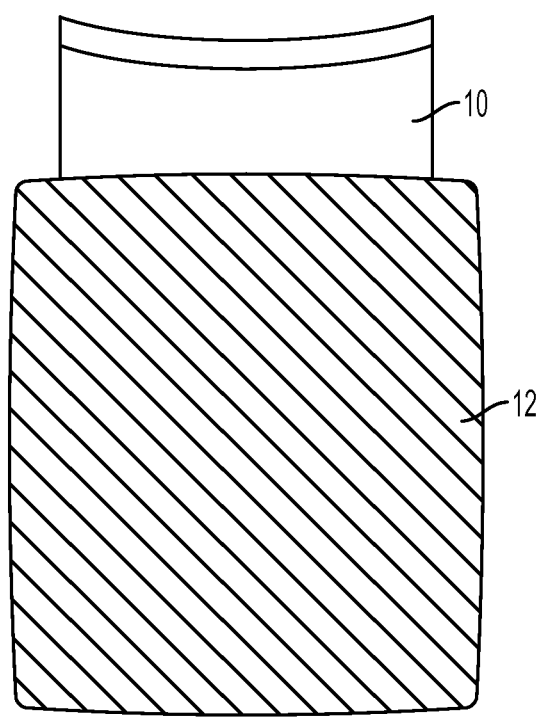
FIG. 4 is a front view of a beverage container inside a beverage koozie.

Another embodiment includes a method of freshening a beverage by exposing the beverage to a container that contains or is adjacent to a bioceramic composition. For example, one method may reduce furfural content in beer by exposing beer containing furfural to a bioceramic composition. For example, as shown in FIG. 4, the bioceramic composition can be incorporated into or applied to at least a portion of the surface of the beer's container 10, such as through a beverage koozie 12. In one embodiment, the bioceramic composition is mixed with a foam precursor that is later used to form the koozie 12. In another embodiment, the bioceramic composition is applied to at least a portion of the surface of the koozie 12 by any coating method known in the art (e.g. applying a liquid carrier containing the bioceramic composition to the koozie 12 by spraying, painting, dipping, and the like). The amount of bioceramic composition incorporated into or applied on the koozie 12 can be any suitable amount. In one embodiment, the amount of the bioceramic composition ranges from about 1 wt % to about 35 wt % by weight of the foam in the koozie. In another embodiment, the amount of the bioceramic composition ranges from about 3 wt % to about 25 wt % by weight of the foam in the koozie. In yet another embodiment, the amount of the bioceramic composition ranges from about 5 wt % to about 15 wt % by weight of the foam in the koozie. In yet another embodiment, the amount of the bioceramic composition ranges from about 7 wt % to about 13 wt % by weight of the foam in the koozie.

The koozie 12 is then placed around a bottle or can 10 containing beer tainted with furfural. The bottle or can 10 remains in the koozie 12 for a time period suitable to reduce the furfural content. In one embodiment, the time period is on the order of minutes (e.g. less than 5 minutes, 5 minutes, 10 minutes, 15 minutes, greater than 15 minutes, etc.). The bioceramic composition can also be incorporated into or on the surface of a beverage container (e.g. can, bottle, or the like) or into or on a label or sticker to be affixed to a bottle or can containing beer or another beverage to be treated. Water or any other beverage can also be treated with the bioceramic composition in a similar manner.

The following non-limiting examples serves to further illustrate the present invention.

EXAMPLES

Example 1: Preparation of a Bioceramic Powder Composition

The kaolinite is extracted in the outskirts of the city of Parintins, in the Amazon State, Brazil. The city is located in the Lower Amazon Region (coordinates: latitude: 2° 37'42" south/longitude: 56° 44' 11" west of Greenwich, 50 m above sea level).

The extracted kaolinite is washed with hydrogen peroxide ($H_2O_2$) and allowed to dry. The dried kaolinite is then finely ground and mixed with tourmaline; aluminum oxide ($Al_2O_3$); silicon dioxide ($SiO_2$); and zirconium oxide ($ZrO_2$) until a homogeneous mixture is achieved. The resulting bioceramic composition contains 50 wt % kaolinite, 10 wt % tourmaline, 18 wt % aluminum oxide, 14 wt % silicon dioxide, and 8 wt % zirconium oxide. The electron microscopy image in FIG. 1 demonstrates that the composition includes bioceramic particles smaller than 1 micrometer.

Example 2: Impregnating Fabric

Figure 2:
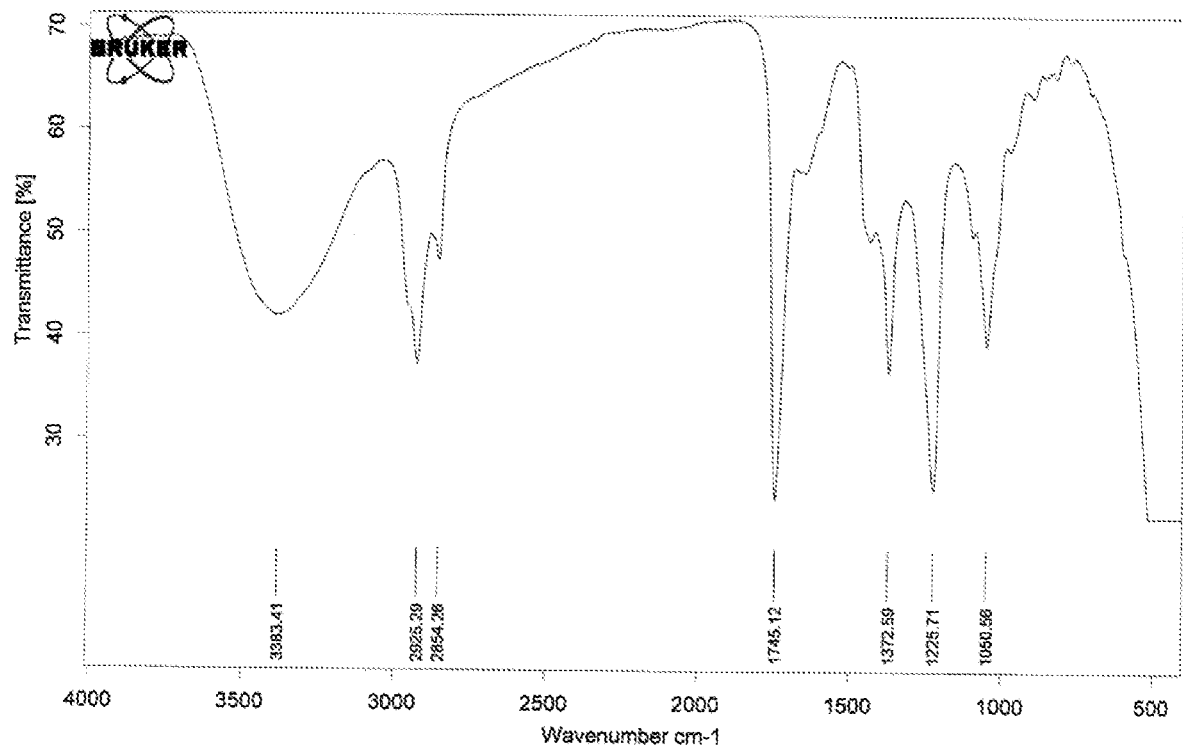
FIG. 2 is a graph of the spectral transmittance of the bioceramic composition also analyzed in FIG. 1 deposited on a cloth substrate (88% polyamide and 12% elastane)
Figure 3:
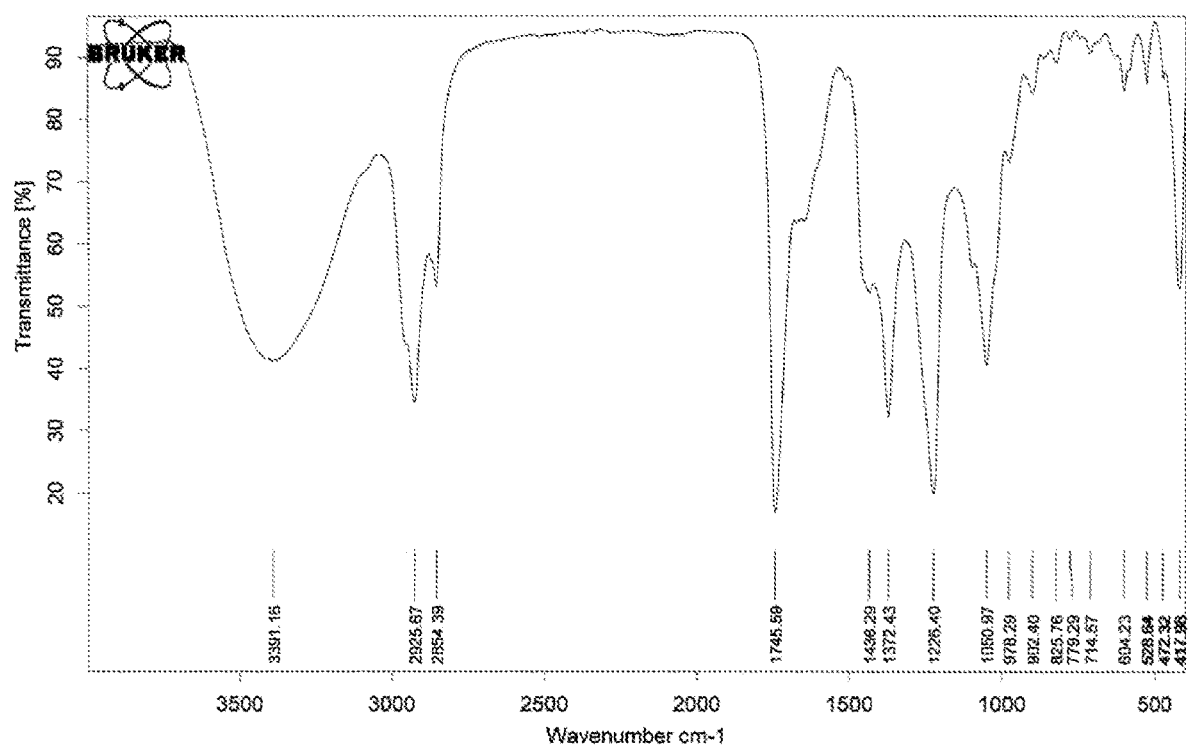
FIG. 3 is a graph of the spectral transmittance of the bioceramic composition also analyzed in FIG. 1 (impregnated in fabric)

A cloth substrate that includes 88 wt % polyamide and 12 wt % elastane was obtained. A bioceramic composition prepared according to the method of Example 1 was incorporated into a plastisol ink in an amount of 10 wt % and mixed. The mixture was applied to the cloth substrate using a traditional silkscreen process. FIG. 2 is a graph of the spectral transmittance of the bioceramic composition deposited on the cloth substrate. FIG. 3 is a graph of the spectral transmittance of the bioceramic composition impregnated in fabric. The numbered peaks in FIGS. 2 and 3 indicate that the bioceramic composition absorbs infrared radiation when incorporated into fabric.

Example 3: Beverage Freshness

A beverage koozie that includes closed-cell extruded polystyrene foam was obtained. A bioceramic composition prepared according to the method of Example 1 was incorporated into a plastic-based paint in an amount of 10% by weight of the paint composition and mixed. The mixture was applied to the interior surface of the koozie. An extruded plastic composition containing the bioceramic composition in an amount of 10% by weight of the plastic was also prepared using a traditional extrusion process. The extruded plastic composition was placed in the bottom of the koozie.

Figure 5:
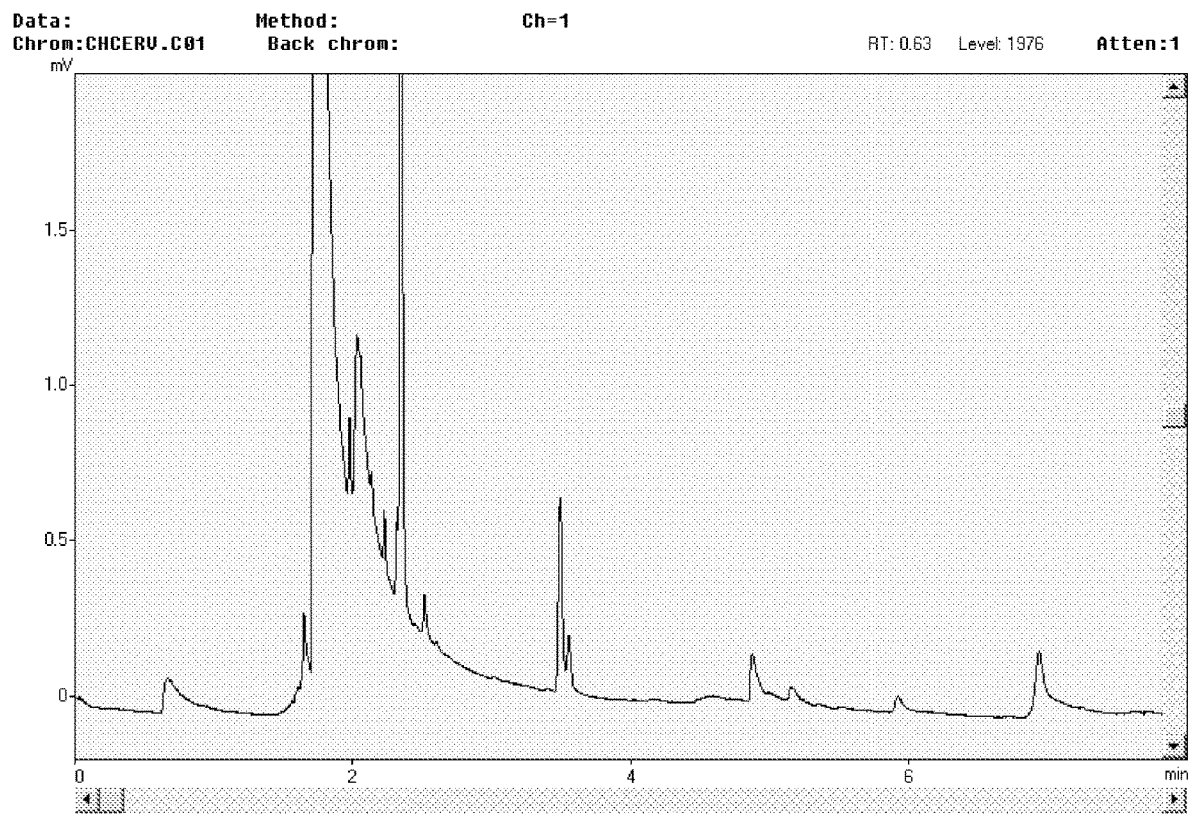
FIG. 5 is a mass spectrum of a 10 mL beer sample prior to exposure to a bioceramic composition.
Figure 6:
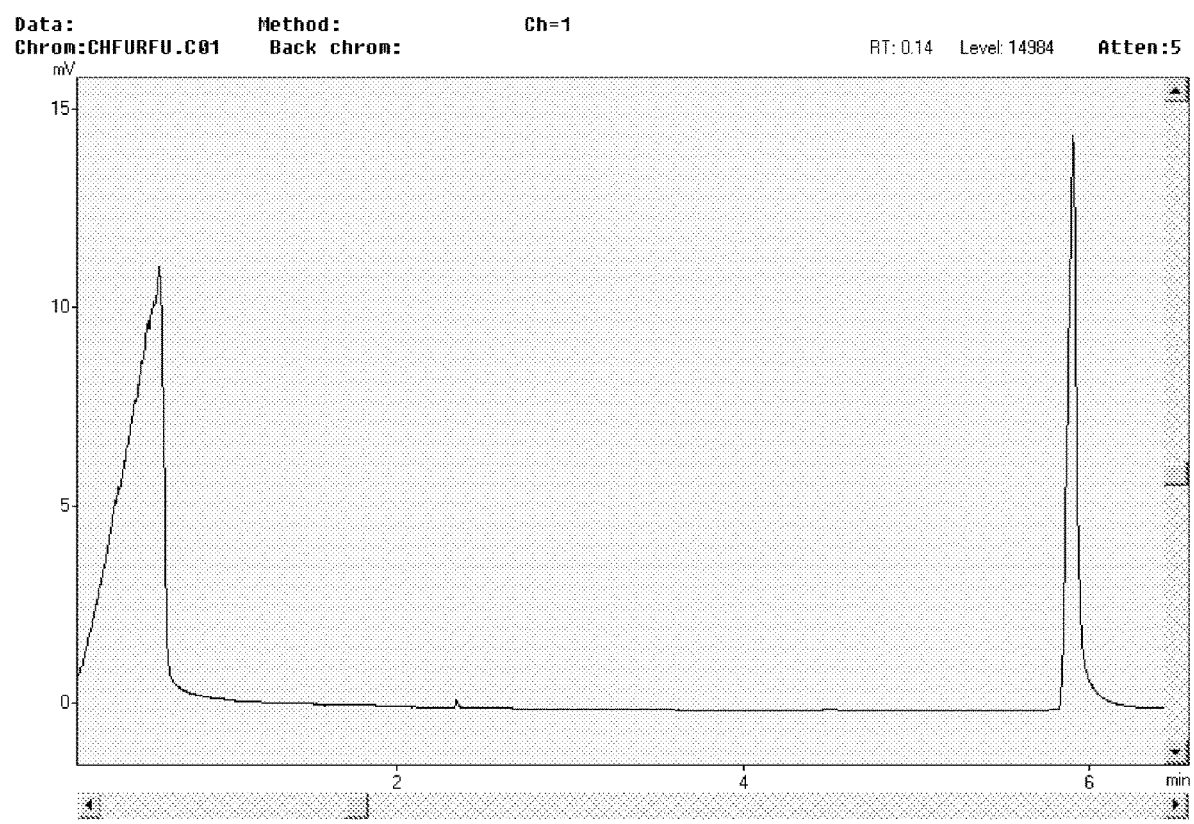
FIG. 6 is a mass spectrum of furfural.
Figure 7:
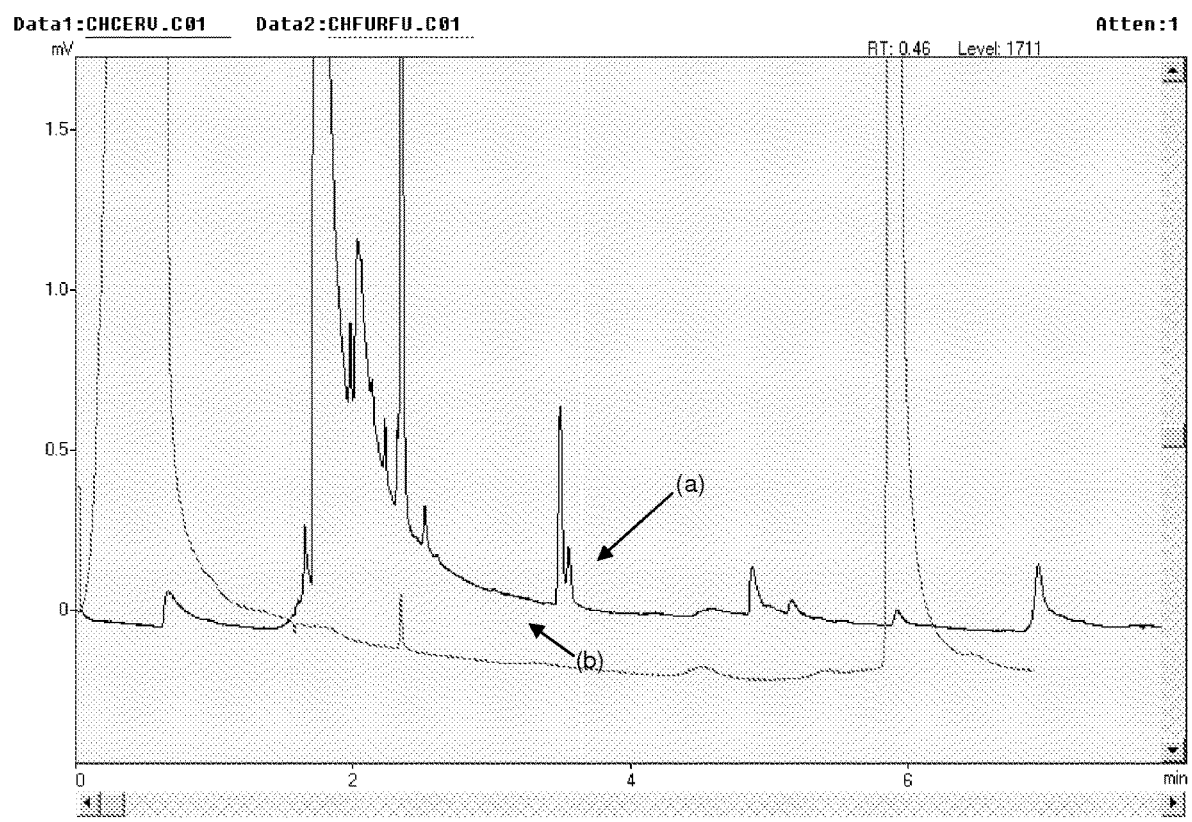
FIG. 7 is an overlay of (a) the mass spectrum of a 10 mL beer sample prior to exposure to a bioceramic composition and (b) the mass spectrum of furfural.

A 10 mL sample of beer that had not yet been exposed to the bioceramic composition in the koozie was analyzed using gas chromatography-mass spectrometry (GC-MS) (FIG. 5). A comparison of FIG. 5 with FIG. 6 (mass spectrum of furfural) revealed the presence of peaks corresponding to furfural in the beer sample (FIG. 7).

Figure 8:
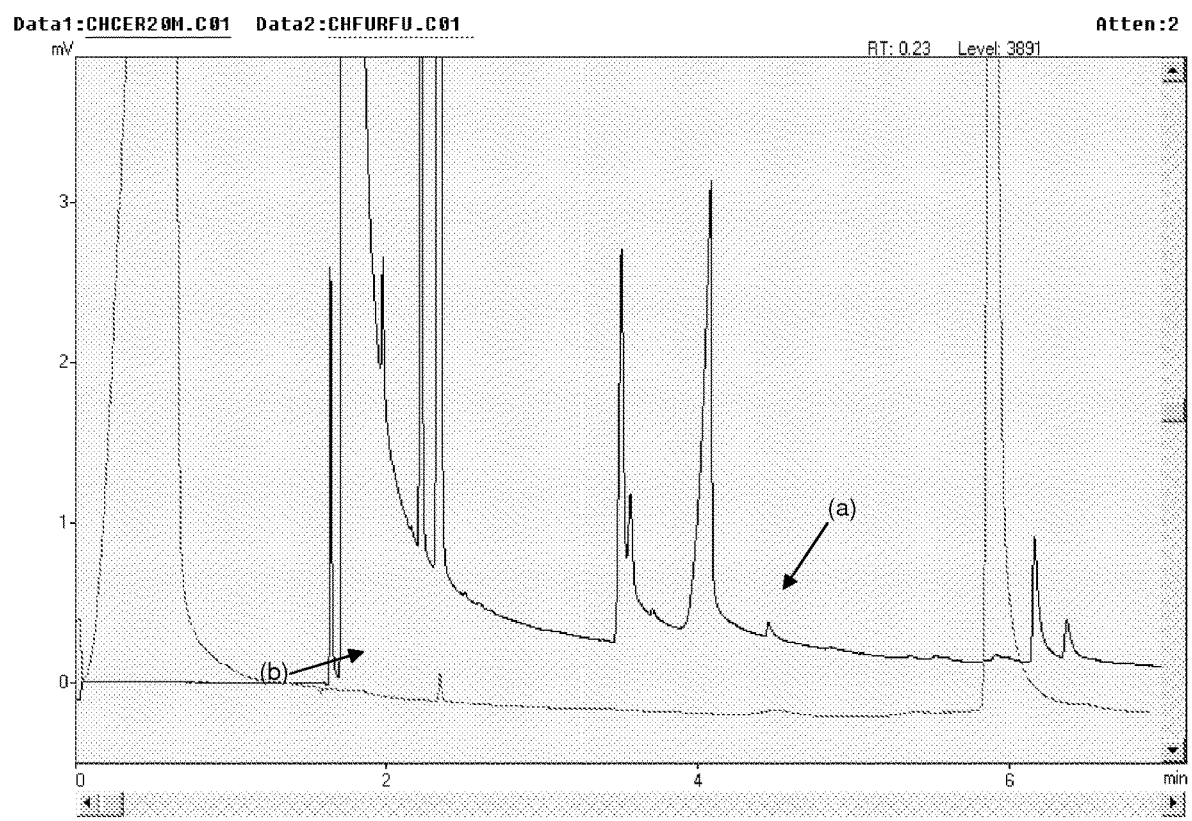
FIG. 8 is an overlay of (a) a mass spectrum of the 10 mL beer sample following exposure to a bioceramic composition and (b) the mass spectrum of furfural.

A can containing the same beer from which the sample was obtained was then placed inside the bioceramic-treated koozie for 10 minutes. The treated koozie covered about ⅔ of the outer surface of the can. Immediately after the 10-minute exposure period, a sample of beer was withdrawn from the can and analyzed using GC-MS (FIG. 8). The analysis revealed the disappearance of furfural from the beer. As shown in FIG. 8, the mass spectrum of the treated beer contained no peaks corresponding to furfural.

All publications cited in the specification, both patent publications and non-patent publications, are indicative of the level of skill of those skilled in the art to which this invention pertains. All these publications are herein fully incorporated by reference to the same extent as if each individual publication were specifically and individually indicated as being incorporated by reference.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A fabric or textile comprising a bioceramic composition comprising a plurality of particles, wherein the bioceramic composition consists of
  a) 45 wt % to 55 wt % kaolinite;
  b) 5 wt % to 15 wt % tourmaline;
  c) 11 wt % to 19 wt % silicon dioxide ($SiO_2$); and
  d) 3 wt % to 18 wt % aluminum oxide ($Al_2O_3$) and
  e) one additional oxide.

2. The fabric or textile of claim 1, wherein the amount of kaolinite ranges from about 45 wt % to about 50 wt % by total weight of the bioceramic composition.

3. The fabric or textile of claim 1, wherein the amount of kaolinite ranges from about 51 wt % to about 55 wt % by total weight of the bioceramic composition.

4. The fabric or textile of claim 1, wherein the amount of kaolinite ranges from about 47 wt % to about 53 wt % by total weight of the bioceramic composition.

5. The fabric or textile of claim 1, wherein the largest dimension of any particle in the fabric or textile ranges from about 0.5 μm to about 25 μm.

6. The fabric or textile of claim 1, wherein the largest dimension of any particle in the fabric or textile is about 20 μm.

7. The fabric or textile of claim 1, wherein the total amount of kaolinite is about 50 w % by total weight of the bioceramic composition.

8. The fabric or textile of claim 1, wherein the total amount of tourmaline is about 10 w % by total weight of the bioceramic composition.

9. The fabric or textile of claim 1, wherein the total amount of silicon dioxide ($SiO_2$) is about 14 w % by total weight of the bioceramic composition.

10. The fabric or textile of claim 1, wherein the total amount of aluminum oxide ($Al_2O_3$) is about 18 w % by total weight of the bioceramic composition.

11. The fabric or textile of claim 1, wherein the tourmaline is of the formula $(Na,Ca)(Mg,Li,A,Fe^{2+})_3Al_6(BO_3)_3Si_6O_{18}(OH)_4$.

12. The fabric or textile of claim 1, wherein the tourmaline is schorl, dravite, elbaite, liddicoatite, uvite, buergerite, or any combination thereof.

13. The fabric or textile of claim 1, wherein the one additional oxide is zirconium oxide ($ZrO_2$).

14. The fabric or textile of claim 13, wherein zirconium oxide ($ZrO_2$) is about 8 wt % by total weight of the bioceramic composition.

15. The fabric or textile of claim 1, wherein the fabric or textile comprises a cloth.

16. The fabric or textile of claim 1, wherein the fabric or textile comprises apparel or garments.

* * * * *